(12) United States Patent
Kim et al.

(10) Patent No.: US 8,615,841 B2
(45) Date of Patent: Dec. 31, 2013

(54) CONNECTING UNIT FOR HOOK WIPER ARM AND FLAT WIPER BLADE WITH THE SAME

(75) Inventors: In Kyu Kim, Ansan-si (KR); Kyung Jong Nam, Cheongcheongnam-do (KR)

(73) Assignees: ADM21 Co., Ltd., Cheongyang-gun (KR); In Kyu Kim, Ansan-Si (KR)

( * ) Notice: Subject to any disclaimer, the term of this patent is extended or adjusted under 35 U.S.C. 154(b) by 0 days.

(21) Appl. No.: 13/814,621

(22) PCT Filed: Sep. 8, 2011

(86) PCT No.: PCT/KR2011/006663
§ 371 (c)(1),
(2), (4) Date: Feb. 6, 2013

(87) PCT Pub. No.: WO2012/033365
PCT Pub. Date: Mar. 15, 2012

(65) Prior Publication Data
US 2013/0139343 A1    Jun. 6, 2013

(30) Foreign Application Priority Data

Sep. 10, 2010 (KR) .................. 10-2010-0089009
Aug. 19, 2011 (KR) .................. 10-2011-0082822

(51) Int. Cl.
*B60S 1/40* (2006.01)
(52) U.S. Cl.
USPC .................. 15/250.32; 15/250.201

(58) Field of Classification Search
USPC .......... 15/250.32, 250.351, 250.201, 250.43, 15/250.44, 250.361
See application file for complete search history.

(56) References Cited

U.S. PATENT DOCUMENTS

| 2,796,623 A | * | 6/1957 | Nesson | 15/250.452 |
| 4,670,934 A | * | 6/1987 | Epple et al. | 15/250.32 |
| 5,611,103 A | * | 3/1997 | Lee | 15/250.32 |
| 5,920,950 A | * | 7/1999 | Young et al. | 15/250.32 |

(Continued)

FOREIGN PATENT DOCUMENTS

| JP | 2001-163188 | * | 6/2001 |
| JP | 2006-96257 | * | 4/2006 |

(Continued)

*Primary Examiner* — Gary Graham
(74) *Attorney, Agent, or Firm* — Sughrue Mion, PLLC

(57) ABSTRACT

A connecting unit for separably connecting a flat wiper blade to a hook wiper arm is provided. The connecting unit has a bracket fixed to a frame of a flat wiper blade, an adaptor pivotally mounted on the bracket and a cover pivotally attached to the adaptor. The adaptor and a linear section of a hook wiper arm are fixed via a first fixing element of the adaptor in a lateral direction of the linear section. The adaptor and a curved section of the hook wiper are fixed via a second fixing element of the adaptor and a third fixing element of the cover in a longitudinal direction of the linear section. When a first locking element of the adaptor and a second locking element of the cover engage each other, the third fixing element fixes the curved section relative to the second fixing element.

12 Claims, 13 Drawing Sheets

(56) References Cited

U.S. PATENT DOCUMENTS

| | | | |
|---|---|---|---|
| 6,000,093 A * | 12/1999 | Charng | 15/250.201 |
| 6,279,191 B1 * | 8/2001 | Kotlarski et al. | 15/250.201 |
| 7,341,396 B2 * | 3/2008 | Huang | 403/326 |
| 7,908,703 B2 | 3/2011 | Van Bealen | |
| 8,413,291 B2 * | 4/2013 | Wu | 15/250.201 |
| 2004/0244137 A1 | 12/2004 | Poton | |
| 2005/0005387 A1 * | 1/2005 | Kinoshita et al. | 15/250.32 |
| 2007/0220698 A1 | 9/2007 | Huang | |
| 2008/0289133 A1 | 11/2008 | Kim | |
| 2011/0056041 A1 * | 3/2011 | Wu | 15/250.32 |

FOREIGN PATENT DOCUMENTS

| | | |
|---|---|---|
| KR | 10-2005-0033046 A | 4/2005 |
| KR | 10-2006-0134912 A | 12/2006 |
| KR | 10-2008-0102564 A | 11/2008 |
| KR | 10-2008-0105227 A | 12/2008 |
| KR | 10-2009-0042785 A | 4/2009 |

* cited by examiner

Fig. 19
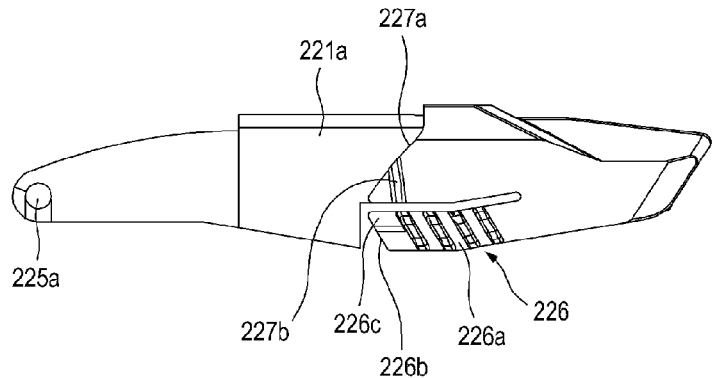
Fig. 20
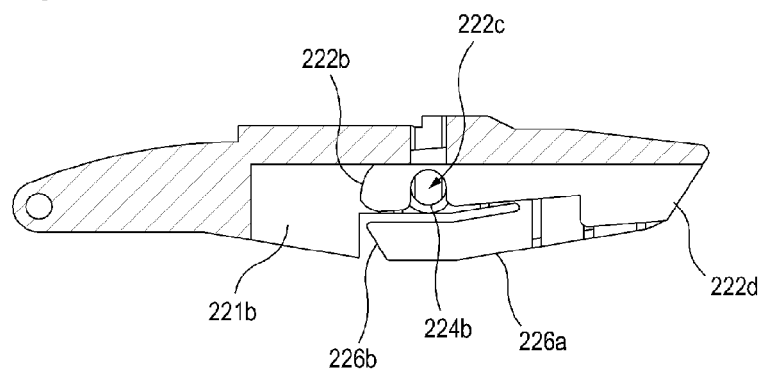
Fig. 21
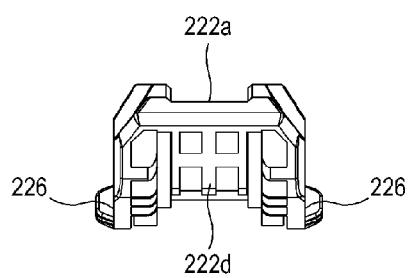
[Fig. 22]
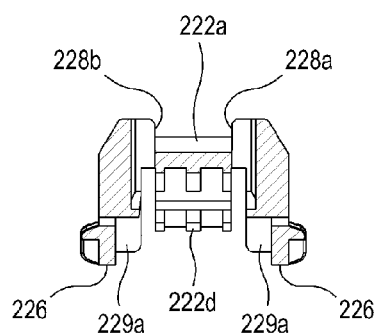

CONNECTING UNIT FOR HOOK WIPER ARM AND FLAT WIPER BLADE WITH THE SAME

RELATED APPLICATIONS

This is a 35 U.S.C. §371 U.S. National Phase of International Application No. PCT/KR2011/006663 filed on Sep. 8, 2011 and published in English as WO 2012/033365A2 on Mar. 15, 2012, which claims priority to KR 10-2010-0089009 filed on Sep. 10, 2010 and KR 10-2011-0082822 filed on Aug. 19, 2011. The contents of the aforementioned applications are incorporated by reference in their entirety.

TECHNICAL FIELD

The present invention relates to a flat wiper blade for use with a windshield of a vehicle. In particular, the present invention relates to a flat wiper blade with a connecting unit configured to be separably connected to a hook wiper arm.

BACKGROUND ART

Motor vehicles are equipped with a windshield wiper device for cleaning or wiping a surface of a windshield. The windshield wiper device includes a wiper motor, a wiper arm and a wiper blade. The wiper arm is connected to a rotating shaft of the wiper motor at its base end and is oscillated by the wiper motor. The wiper blade is separably joined to a distal end of the wiper arm. The wiper blade is positioned on the surface of the windshield by the wiper arm. The wiper blade wipes the surface of the windshield while sliding thereon through oscillating movements of the wiper arm.

The wiper blade has an elongated wiper strip and a frame for holding and supporting the wiper strip in its longitudinal direction. The wiper strip is placed in contact with the windshield surface. The frame may comprise an assembly including a main yoke and a plurality of sub yokes linked to the main yoke. A wiper blade with such a frame is known in the art as "a conventional wiper blade." A wiper blade, which uses a single frame curving with a certain curvature and having a thin and elongated bar shape as the frame, has been recently used. Such a wiper blade is known in the art as "a flat wiper blade" or "a flat-bar wiper blade." The flat wiper blade has a height lower than a conventional wiper blade and is subjected to less air resistance when compared to the conventional wiper blade. Further, the flat wiper blade can bring its wiper strip into contact the windshield surface under a uniform load.

The flat wiper blade may be connected to a wiper arm via a connecting unit attached to a midway section of a frame and is separably coupled to a distal end of the wiper arm. FIG. 1 shows "a hook wiper arm" with a hook-shaped distal end portion as one example of the wiper arm. The hook wiper arm 1 has been widely used due to a simple shape of the distal end portion. The flat wiper blade and the hook wiper arm 1 are connected to each other by using such a hook shape. By way of example, Korean Patent Application Publication No. 10-2005-0033046 discloses a connection example between a flat wiper blade and a hook wiper arm. This reference teaches that the flat wiper blade and the hook wiper arm are connected to each other in such a manner that a connecting unit attached in the flat wiper blade is hooked to a hook portion of the hook wiper arm.

SUMMARY

A prior art connecting unit is not configured to achieve a stable and firm connection between the flat wiper blade and the hook wiper arm. Further, if the wiper strip is worn out beyond a certain permissible limit, then the flat wiper blade must be replaced appropriately. However, a prior art connecting unit is unsatisfactory in terms of easy separation of the flat wiper blade from the hook wiper arm.

The present invention is directed to solving the aforementioned problems of the prior art. It is an object of the present invention to provide a connecting unit provided on a flat wipe blade for separably connecting the flat wiper blade to a hook wiper arm.

It is a further object of the present invention is to provide a flat wiper blade with a connecting unit simply and firmly connecting the flat wiper blade to the hook wiper arm and further comprising spoilers being in engagement with the connecting unit.

To achieve the above and other objects, according to one aspect of the present invention, there is provided a connecting unit for separably connecting a flat wiper blade to a wiper arm with a linear section and a curved section extending from the linear section at a distal end.

The connecting unit comprises a bracket, an adaptor and a cover. The bracket is fixed to a frame of a flat wiper blade and has a pivot shaft. The adaptor is pivotally mounted on the bracket via the pivot shaft. The adaptor is configured to support at least a portion of the linear section and to receive the curved section. The cover is pivotally attached to the adaptor in a longitudinal direction of the linear section. The adaptor includes: a first fixing element for fixing between the adaptor and at least the portion of the linear section in a lateral direction of the linear section; a second fixing element for fixing between the adaptor and the curved section in the longitudinal direction of the linear section; and a first locking element for separable fixing between the cover and the adaptor. The cover includes a third fixing element corresponding to the second fixing element and a second locking element corresponding to the first locking element. When the first locking element and the second locking element are in engagement with each other, the third fixing element fixes at least a portion of the curved section relative to the second fixing element in the longitudinal direction of the linear section.

In an embodiment of the present invention, the second fixing element comprises a curved seat surface, on which at least the portion of the curved section is seated. The third fixing element comprises a curved fixing surface facing at least the portion of the curved section. When the cover is fixed to the adaptor, the curved seat surface and the curved fixing surface are locked relative to each other.

The first locking element comprises a latch having a first engagement surface at a front end. The second locking element comprises an edge of the cover engaging the first engagement surface. The latch elastically curves by contact to the cover and snap-engages the edge of the cover.

In an embodiment of the present invention, the first fixing element comprises: a flat seat surface, on which at least the portion of the linear section is seated; and a pair of stepped portions contacting at least the portion of the linear section. The flat seat surface extends in the longitudinal direction of the linear section and the stepped portions extend from the flat seat surface in the lateral direction of the linear section.

Further, in an embodiment of the present invention, the adaptor includes a pair of sidewall portions and a bridge portion connecting the sidewall portions. The pivot shaft is fitted to inner surfaces of the sidewall portions.

In such a case, the second fixing element comprises a curved seat surface, on which at least the portion of the curved section is seated. The curved seat surface is formed in a front end of the bridge portion. The third fixing element comprises a curved fixing surface protruding from an inside of the cover and facing to at least the portion of the curved section. Further, the first locking element comprises a flexible latch having a first engagement surface and extending from the sidewall portion. The second locking element comprises a locking notch formed in an edge of the cover and having a second engagement surface engaging the first engagement surface. When the first engagement surface and the second engagement surface engage each other, the curved fixing surface fixes at least the portion of the curved section relative to the curved seat surface in the longitudinal direction of the linear section.

A lower portion of the sidewall portion is slit in part to form the latch and a lower end of the latch defines a portion of a lower end of the sidewall portion.

Further, the latch includes a contact surface adjoining the first engagement surface and the locking notch includes a pressure surface adjoining the second engagement surface. When the cover is pivoted to the adaptor, the pressure surface is brought into contact with the contact surface.

The locking notch includes a second stopper surface and the sidewall portion includes a first stopper surface complementarily contacting the second stopper surface.

The sidewall portions include a shaft holder on the respective inner surfaces. The shaft holders support ends of the pivot shaft. The bridge portion includes a recess configured to receive the pivot shaft.

The first fixing element comprises: a flat seat surface formed in the bridge portion and extending in the longitudinal direction of the linear section; and a pair of stepped portions formed between the flat seat surface and upper ends of the sidewall portions. At least the portion of the linear section is seated on the flat seat surface between the stepped portions.

In an embodiment of the present invention, the frame has a pair of notches at opposed edges. The bracket includes a pair of holding claws and an engaging protrusion at each of lower opposed edges. The edges of the frame reside on the holding claws and the notch and the engaging protrusion engage each other.

A further aspect relates to a flat wiper blade applicable to a hook wiper arm. In an exemplary embodiment, the flat wiper blade comprises: a wiper strip; a frame configured to hold and support the wiper strip; first and second spoilers configured to be joined to the frame by fitting engagement; and the above-described connecting unit coupled to the frame between the first and second spoilers. The first spoiler and the bracket of the connecting unit engage each other and the second spoiler and the bracket engage each other.

According to the connecting unit of the embodiments, the adaptor and the hook-shaped coupling element are fixed to each other in both lateral and longitudinal directions of the hook-shaped coupling element. Further, the adaptor and the hook-shaped coupling element are separably locked in the longitudinal direction of the hook-shaped coupling element. Thus, the connecting unit provides a firm and easily-separable connection configuration between the adaptor and the hook-shaped coupling element. Further, the flat wiper blade according to embodiments has a configuration with its spoilers integrated thereto since the connecting unit and the spoilers are engaged to one another.

BRIEF DESCRIPTION OF DRAWINGS

FIG. 19 is a right side view of the adaptor.

FIG. 20 is a sectional view taken along the line 20-20 in FIG. 18.

FIG. 21 is a rear view of the adaptor.

FIG. 22 is a sectional view taken along the line 22-22 in FIG. 18.

DETAILED DESCRIPTION

Figure 1:
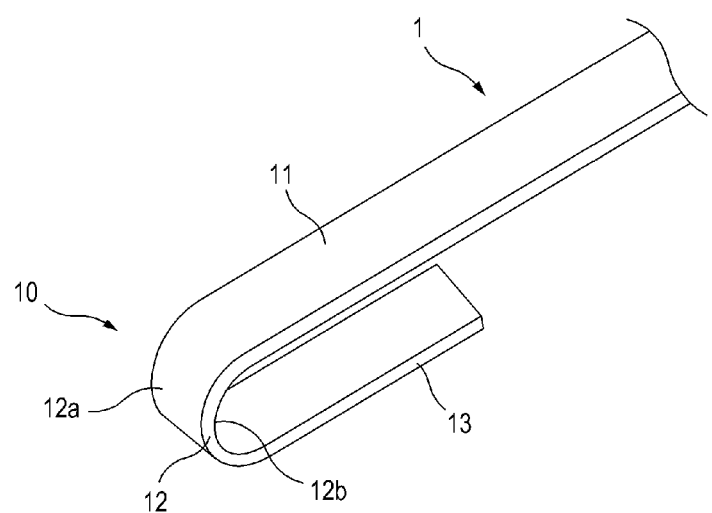
FIG. 1 is a perspective view showing a wiper arm and a hook-shaped coupling element.

Embodiments of a flat wiper blade and embodiments of a connecting unit for connecting a flat wiper blade to a hook wiper arm are described more fully with reference to the accompanying drawings. Like reference numerals in the drawings refer to like elements or parts.

As used herein, the directional term "upper," "upward" or the like is generally based on an orientation, with which a bracket is placed relative to a frame bar in the drawings, while the directional term "lower," "downward" or the like generally refers to a direction opposite to the upward or upper direction. A flat wiper blade shown in the accompanying drawings may be otherwise oriented (e.g., rotated 180 degrees or at other orientations) and the aforementioned directional terms may be interpreted accordingly. Further, as used herein, the directional term "forward", "front" or the like generally refers to a direction away from a wiper arm in a longitudinal direction of the wiper arm, while the directional term "backward," "rearward," "rear" or the like generally refers to a direction opposite to the forward or front direction.

A flat wiper blade according to embodiments is constructed to be applicable to a wiper arm with a hook-shaped coupling element at its distal end. With reference to FIG. 1, a wiper arm, to which the flat wiper blade according to embodiments may be applied, and its hook-shaped coupling element will be first described.

The wiper arm 1 is connected to a rotating shaft of a wiper motor at its base end and has a hook coupling element 10 at its distal end. The hook coupling element 10 includes the following: a linear section 11; a curved section 12 extending from the linear section 11 and being curved in a generally semicircular shape; and an extension section 13 extending rearward from the curved section 12 parallel to the linear section 12. The curved section 12 has an outer surface 12*a* that is an outside of the semicircular shape and an inner surface 12*b* that is an inside of the semicircular shape. The flat wiper blade according to embodiments includes an adaptor configured to be suitable for the hook coupling element 10. The flat wiper blade according to embodiments is connected to the wiper arm 1 by both lateral fixing and longitudinal fixing between the adaptor and the hook coupling element 10.

Figure 2:
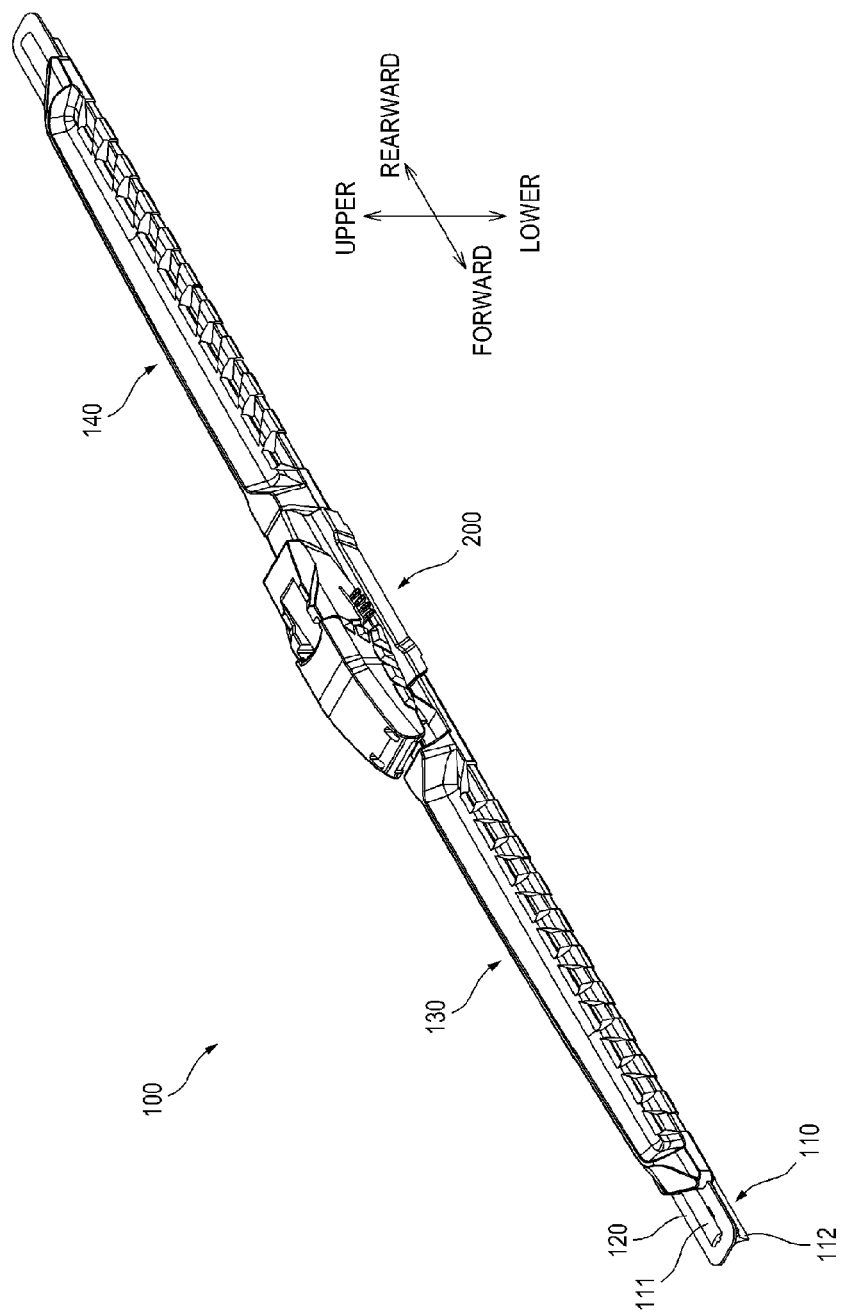
FIG. 2 is a perspective view showing a flat wiper blade according to one embodiment.
Figure 3:
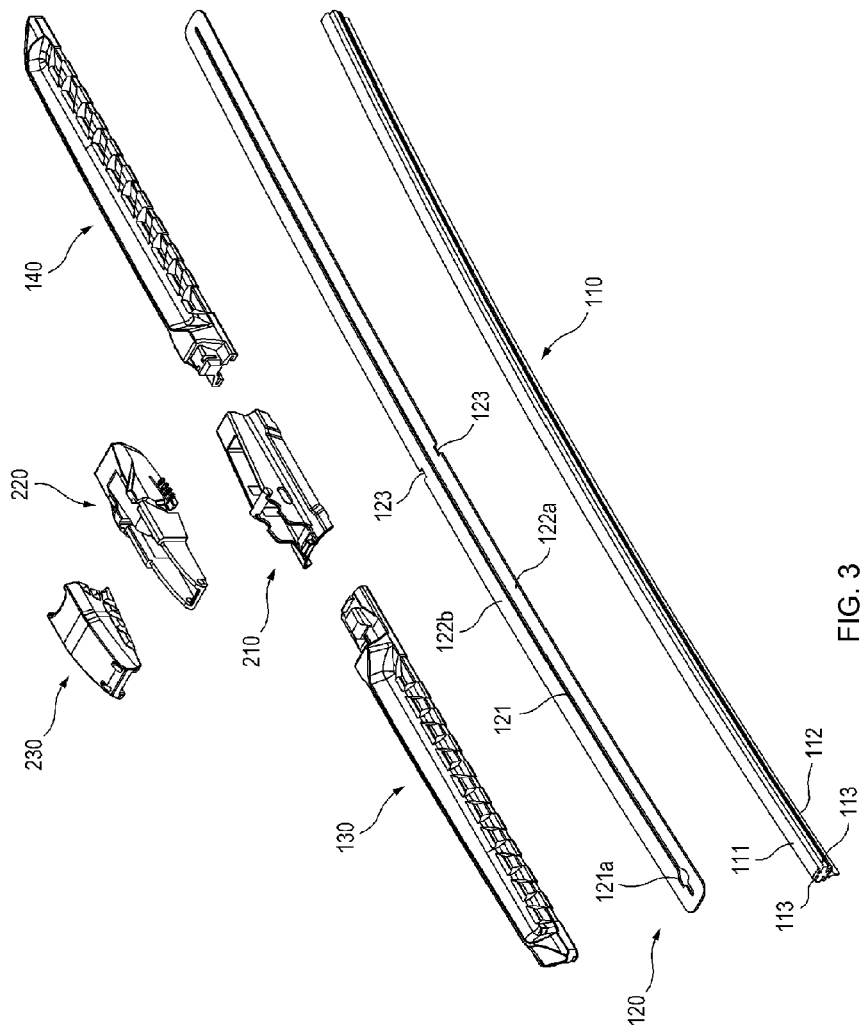
FIG. 3 is an exploded perspective view showing the flat wiper blade shown in FIG. 2.
Figure 4:
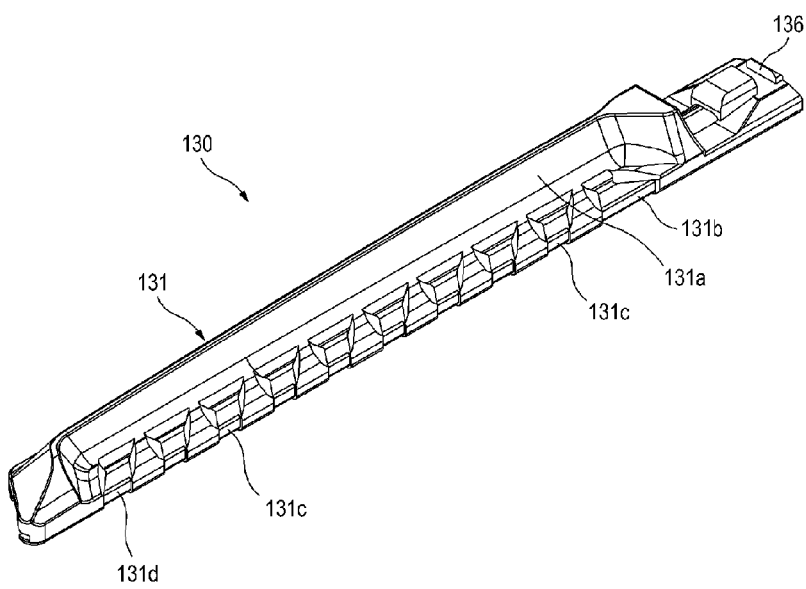
FIG. 4 is a perspective view of a first spoiler.
Figure 5:
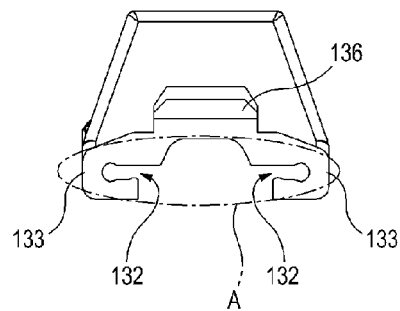
FIG. 5 is an end view of a base end of the first spoiler.
Figure 6:
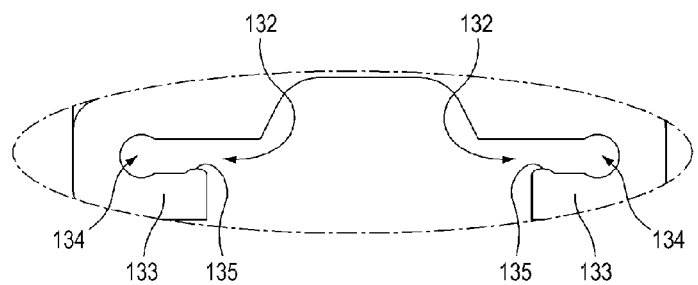
FIG. 6 is an enlarged view of a portion A in FIG. 5.
Figure 7:
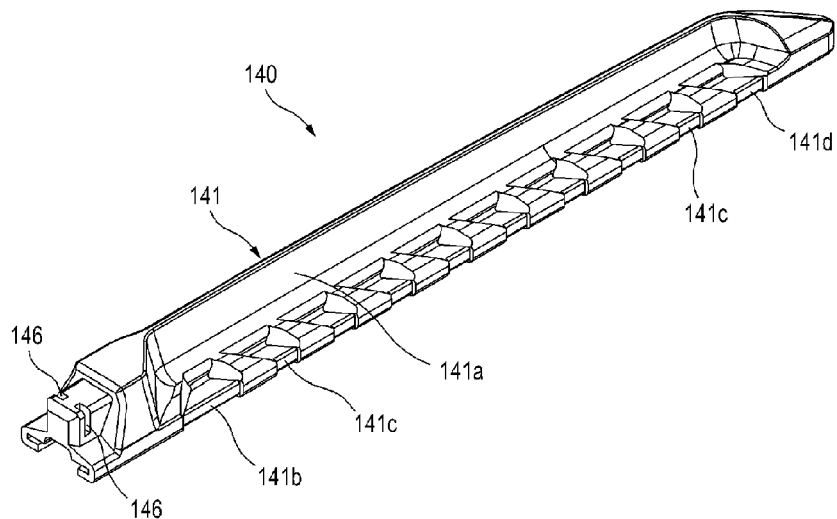
FIG. 7 is a perspective view of a second spoiler.
Figure 8:
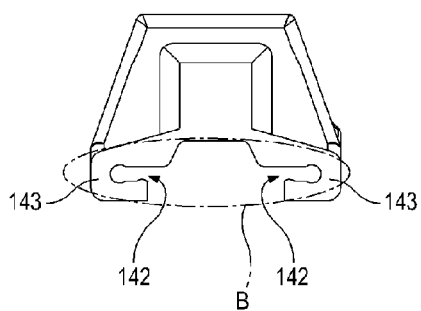
FIG. 8 is an end view of a base end of the second spoiler.
Figure 9:
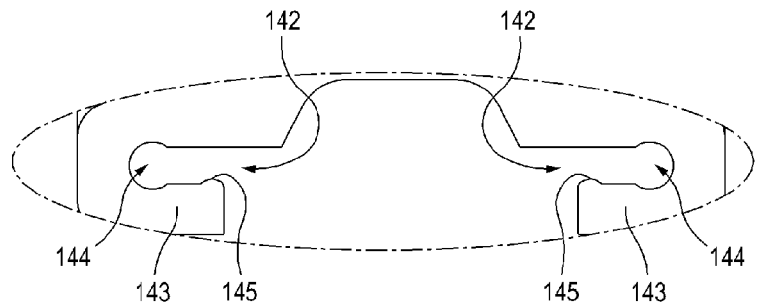
FIG. 9 is an enlarged view of a portion B in FIG. 8.
Figure 10:
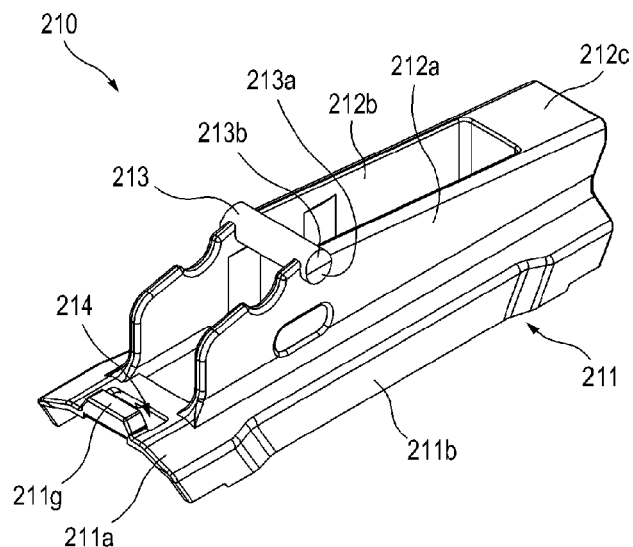
FIG. 10 is an upper perspective view of a bracket.
Figure 11:
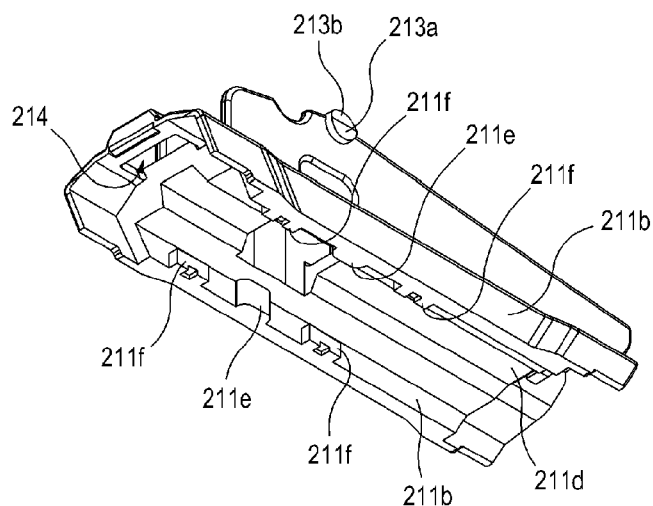
FIG. 11 is a lower perspective view of the bracket.
Figure 12:
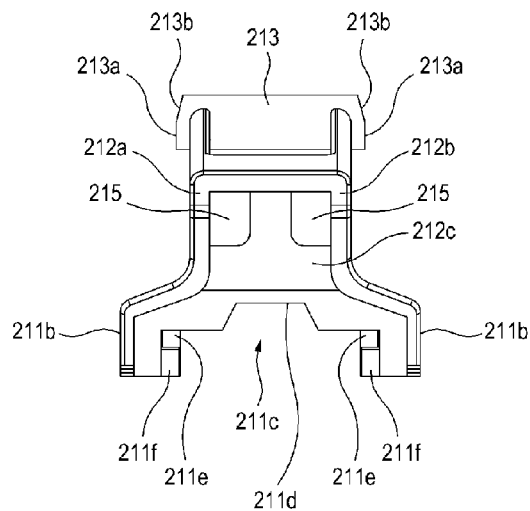
FIG. 12 is a rear view of the bracket.
Figure 13:
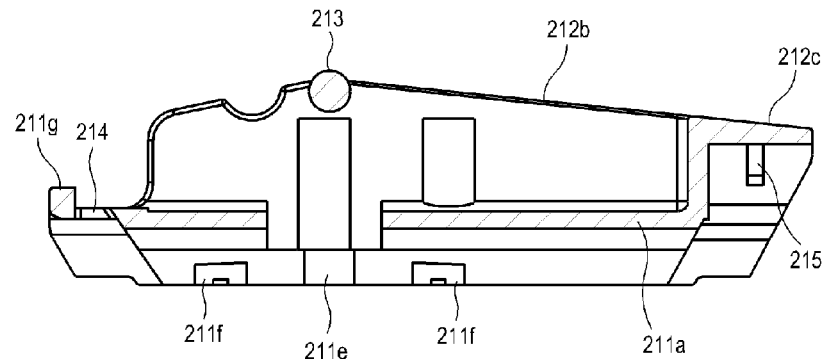
FIG. 13 is a longitudinally sectional view of the bracket.

Referring to FIGS. 2 and 3, in one exemplary embodiment, a flat wiper blade 100 includes the following: a wiper strip 110; a single elongated frame (a frame bar 120) for holding and supporting the wiper strip; and a connecting unit 200 positioned on the frame bar 120 for separably connecting an assembly of the wiper strip 110 and the frame bar 120 to the wiper arm 1. In one embodiment, the connecting unit 200 includes the following: a bracket 210 fixed to the frame bar 120; an adaptor 220 pivotally mounted on the bracket 210; and a cover 230 attached to the adaptor 220.

The wiper strip 110 may be made from, for example, a rubber or an elastomer material. The wiper strip 110 has a head portion 111, which extends longitudinally and is placed on the frame bar 120, at its upper end and a wiper lip 112, which extends longitudinally and contacts a surface of a windshield, at its lower end. The wiper strip 110 has a pair of grooves 113 for coupling to the frame bar 120 beneath the head portion 111. The grooves 113 extend in a longitudinal direction of the wiper strip 110.

The frame bar 120 functions as a frame of the flat wipe blade 100. The frame bar 120 fixes and supports the wiper strip 110 in the longitudinal direction thereof. The frame bar 120 has a shape of a thin and elongated bar. The frame bar 120 may be made from a metallic or plastic material. The frame bar 120 may be curved with a certain curvature as shown in FIG. 3. Alternatively, the frame bar may be formed without any curvature.

The frame bar 120 has a slot 121 formed along a longitudinal direction of the frame bar. The slot 121 extends from the proximity of a front end of the frame bar 120 to the proximity of a rear end of the frame bar. The frame bar 120 has a first half section 122*a* and a second half section 122*b* with respect to the slot 121. A triangular insertion inlet 121*a* is formed at one end of the slot 121. Since the frame bar 120 has the slot 121 formed along its longitudinal center line, if forces are applied to both longitudinal edges of the frame bar 120 inwardly of the frame bar, then each half section 122*a*, 122*b* of the frame bar 120 can flex or curve inwardly. Further, the frame bar 120 has a notch 123 at either edge in the middle section. The notches 123 are concave inwardly from an outer edge of each half section 122*a*, 122*b*. The notches 123 participate in engagement to the bracket 210 of the connecting unit 200. The wiper strip 110 may be affixed to the frame bar 120 by inserting its one end to the insertion inlet 121*a* and then fitting in along the slot 121 of the frame bar 120. Specifically, the wiper strip 110 may be joined to the frame bar 120 by inserting one end portion of the head portion 111 to the insertion inlet 121*a* and then fitting a portion between the grooves 113 into the slot 121. When the wiper strip 110 is joined to the frame bar 120, the head portion 111 of the wiper strip 110 protrudes on an upper surface of the frame bar 120.

Further, in this embodiment, the flat wiper blade 100 has a first spoiler 130 and a second spoiler 140, which are joined to the frame bar 120 in front and rear of the bracket 210 respectively. The first and second spoilers 130, 140 are fixed to the frame bar 120 along the longitudinal direction of the frame bar through fitting of the frame bar into the spoilers. Further, the first and second spoilers 130, 140 are coupled to the bracket 210 through engagement therebetween. The first and second spoilers 130, 140 react on wind or air stream impinging on the flat wiper blade 100 during running of a vehicle, thereby producing a reaction force preventing the flat wiper blade 100 from rising up.

The first and second spoilers 130, 140 may be made from a rubber material. The first and second spoilers 130, 140 have a symmetrical shape except for a portion to be coupled to the bracket 210 of the connecting unit 200.

As shown in FIGS. 4 to 9, the first and second spoilers 130, 140 have vane portions 131, 141 that are symmetrically shaped. The vane portion 131, 141 is elongated and extends from the proximity of the base end (an end facing toward the bracket 210) of each spoiler 130, 140 to a distal end of each spoiler. The vane portion 131, 141 has a concave surface 131*a*, 141*a*, which is concave inwardly of the vane portion, at a portion where wind or air stream comes in. The concave surface 131*a*, 141*a* is concave in both lateral and longitudinal directions of the vane portion 131, 141. The concave surface 131*a*, 141*a* extends from the proximity of the base end of the spoiler 130, 140 to the distal end of the spoiler along the vane portion 131, 141. The concave surface 131*a*, 141*a* concave toward the inside of the vane portion increases the reaction force from the reaction against the wind or air stream coming to the vane portion 131, 141 during running of a vehicle, thus enhancing the anti-lift effect. Further, the vane portion 131, 141 has a plurality of indents 131*b*, 131*c*, 131*d*, 141*b*, 141*c*, 141*d* for increasing the reaction against the wind or air stream. The indents 131*b*, 131*c*, 131*d*, 141*b*, 141*c*, 141*d* are located in a lateral edge (a leading edge) of the concave surface 131*a*, 141*a*. The indents 131*b*, 131*c*, 131*d*, 141*b*, 141*c*, 141*d* are arranged along the leading edge at equal or predetermined spacing. The vane portion may have a profile different from the above-described profile. By way of example, the vane portion may have a streamline cross-section such as a circular arc shape. Further, such a cross-section may become gradually smaller from the base end of each spoiler toward the distal end.

The first and second spoilers 130, 140 have a pair of fitting grooves 132, 142, to which the half sections 122*a*, 122*b* of the frame bar 120 are inserted and fitted respectively. The fitting grooves 132, 142 longitudinally extend from the base end of each spoiler to the distal end underneath the vane portion 131, 141. In this embodiment, the first and second spoilers 130, 140 have a pair of holders 133, 143 for fitting of the frame bar 120. The holders 133, 143 have a hook-shaped cross section. The holders 133, 143 extend along either lower lateral edge of the spoiler. The fitting grooves 132, 142 are formed in a portion of the holder 133, 143, which face the inside of the spoiler. Further, the first and second spoilers have round grooves, chamfer grooves or receiving grooves 134, 144 in an innermost portion of the fitting grooves 132, 142. The receiving grooves 134, 144 extend along the fitting grooves 132, 142 and receive the lateral edges of the frame bar 120. The receiving grooves 134, 144 have a circular or oval cross section. A width or diameter of the receiving groove 134, 144 is greater than a width of the fitting groove 132, 142 (a distance between an upper surface and a lower surface of the fitting groove). Right-angled corners in the edge of the frame bar 120 contact an inner rounded surface of the receiving groove 134, 144. Thus, the fitting grooves 132, 142 do not have points or portions on which stresses or forces concentrate, thus enhancing durability of the first and second spoilers 130, 140. Further, the first and second spoilers 130, 140 have pressing ridges 135, 145 that protrude on a lower surface of the fitting groove 132, 142 and extend along the fitting groove 132, 142. The pressing ridges 135, 145 allow the fitting groove 132, 142 to receive frame bars having different thicknesses. Further, the pressing ridges 135, 145 allow the frame bar 120 to be closely fitted to the fitting grooves 132, 142.

The bracket 210 and the first and second spoilers 130, 140 of the flat wiper blade 100 have an element for interlock therebetween. Said element may comprise a first element and a second element which complementarily engage each other. The first element is provided in the bracket 210, while the second element is provided in each of the first and second spoilers 130, 140. In this embodiment, the second element includes a latching claw 136 formed in the base end of the first spoiler 130 and a pair of latching grooves 146 formed in the base end of the second spoiler 140.

Referring back to FIGS. 2 and 3, as described above, the connecting unit 200 is configured to separably connect the assembly comprised of the wiper strip 110 and the frame bar 120 (or, an assembly comprised of the wiper strip 110, the frame bar 120 and the first and second spoilers 130, 140) to the wiper arm 1. The connecting unit 200 includes the following: the bracket 210 fixed to the frame bar 120; the adaptor 220 pivotally mounted on the bracket 210; and the cover 230 pivotally attached to the adaptor 220 and participating in lock between the adaptor and the wiper arm.

Descriptions will be made as to the bracket 210 with reference to FIGS. 10 to 13. The bracket 210 serves as a base on which the adaptor 220 is mounted. The bracket 210 functions to hold the frame bar 120 during operation of the wiper arm. The bracket 210 is disposed in a midway portion of the frame bar 120. For example, the bracket 210 is joined to the frame bar 120 in such a manner that a part of the bracket 210 engages the edge of the frame bar 120 and holds the edge portion of the frame bar 120.

The bracket 210 includes the following: a holder 211 configured to substantially cover up the frame bar 120 in a lateral direction of the frame bar; a pair of support wall portions 212a, 212b vertically formed on the holder 211; and a pivot shaft 213 disposed at an upper end of the support wall portions 212a, 212b with a portion thereof protruding on the upper end.

The holder 211 has a generally fork-like cross section. The holder 211 has a base portion 211a placed on the frame bar 120 and a pair of leg portions 211b extending downwardly from lateral edges of the base portion 211a. A distance between the leg portions 211b is equal to or somewhat smaller than the width of the frame bar 120. The frame bar 120 is positioned in a space 211c defined by the base portion 211a and the leg portions 211b. A groove or recess 211d longitudinally extends on an underside of the base portion 211a. The groove 211d functions to receive the head portion 111 of the wiper strip 110 appearing on the frame bar 120. The bracket 210 has engaging protrusions 211e protruding from lower edges of the leg portions 211b toward the space 211c. The engaging protrusion 211e is shaped to corresponding to the notch 123 formed in the frame bar 120. Further, the holder 211 has holding claws 211f protruding from the leg portions 211b toward the space 211c. The holding claws 211f is disposed on the lower edges of the leg portions 211b with the engaging protrusion 211 therebetween. The edge portion of the frame bar 120 is situated on top of the holding claws 211f. One side of the holding claw 211f facing toward the engaging protrusion 211e is higher than the opposite side thereof. When assembling the frame bar 120 and the bracket 210 together, one of the notches 123 of the frame bar 120 is first engaged to the engaging protrusion 211e as the half sections 122a, 122b of the frame bar 120 are closed to each other. Then, a portion adjacent to the notch 123 is pushed in between the base portion 211a and the holding claws 211f. Thereafter, the other half section of the frame bar 120 is fully pushed into the space 211c and the force exerted to each half section of the frame bar 120 is removed. Then, each half section reverts to its initial position due to elasticity of the frame bar 120 and thus the frame bar 120 is fully situated within the space 211c. When the frame bar 120 and the bracket 210 are assembled to each other, the engaging protrusions 211e of the bracket 210 and the notches 123 are in engagement with each other. Thus, the frame bar 120 and the bracket 210 are fixed in the longitudinal direction of the frame bar 120. Further, when assembled, each half section 122a, 122b of the frame bar 120 is placed between the lower surface of the base portion 211a and the upper surfaces of the holding claws 211f with a little play or gap therebetween. Thus, the frame bar 120 and the bracket 210 are fixed in a direction perpendicular to the longitudinal direction of the frame bar 120.

The support wall portions 212a, 212b are formed parallel to each other on the base portion 211a of the holder 211. A distance between the support wall portions 212a, 212b is less than a width of the base portion 211a. Further, rear edges of the support wall portions 212a, 212b are continued to a rear edge of the holder 211, while front edges of the support wall portions are not continued to a front edge of the holder 211. That is, when viewing the bracket 210 sideways, the rear edges of the holder 211 and the support wall portions 212a, 212b are in a line, whereas the front edge of the support wall portions 212a, 212b is spaced rearward from the front edge of the holder 211. Accordingly, the bracket 210 is configured such that its forward portion is lower than its rearward portion, thereby increasing a pivoting range of the adaptor 220 on its forward portion. Further, a bridge portion 212c is formed in the rear end portion of the support wall portion 212a, 212b. The bridge portion 212c is angularly bent.

The pivot shaft 213 extends on top of the support wall portions 212a, 212b with an orientation substantially perpendicular to the longitudinal direction of the frame bar 120. Both lateral ends 213a of the pivot shaft 213 slightly protrude outwardly of the support wall portions 212a, 212b. The both lateral ends 213a of the pivot shaft 213 have a beveled surface 213b to facilitate mounting the adaptor 220. The pivot shaft 213 is fitted to or engages the adaptor 220, thereby joining the adaptor 220 to the bracket 210. The pivot shaft 213 serves as a pivot center of the flat wiper blade 100 with respect to the wiper arm 1.

In this embodiment, the bracket 210 has a slot and an engaging rib as the first element for securing the first and second spoilers 130, 140 to the bracket 210. Specifically, the bracket 210 has a slot 214 in the vicinity of a front end portion of the base portion 211a, in which the support wall portions 212a, 212b do not exist. The slot 214 extends perpendicularly to the longitudinal direction of the frame bar 120. A catch protrusion 211g is formed at the front end of the base portion 211a adjacent to the slot 214. Further, the bracket 210 has a pair of engaging ribs 215 in the bridge portion 212c at the rear end portion.

Figure 14:
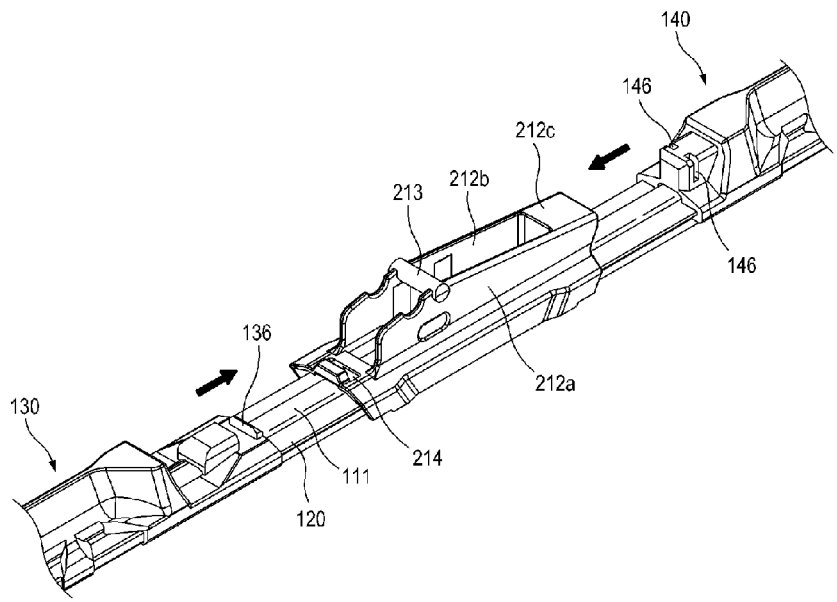
FIG. 14 is a perspective view showing a coupling between the bracket and the first and second spoilers.
Figure 15:
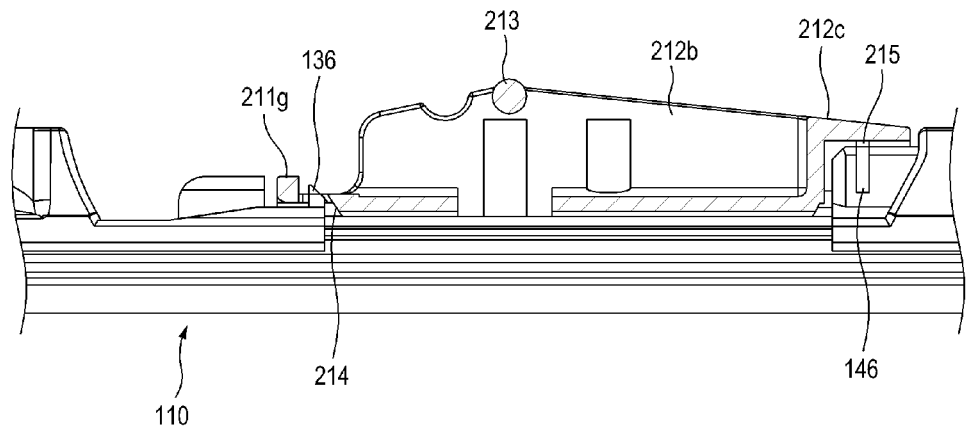
FIG. 15 is a sectional view showing a coupled configuration between the bracket and the first and second spoilers.
Figure 16:
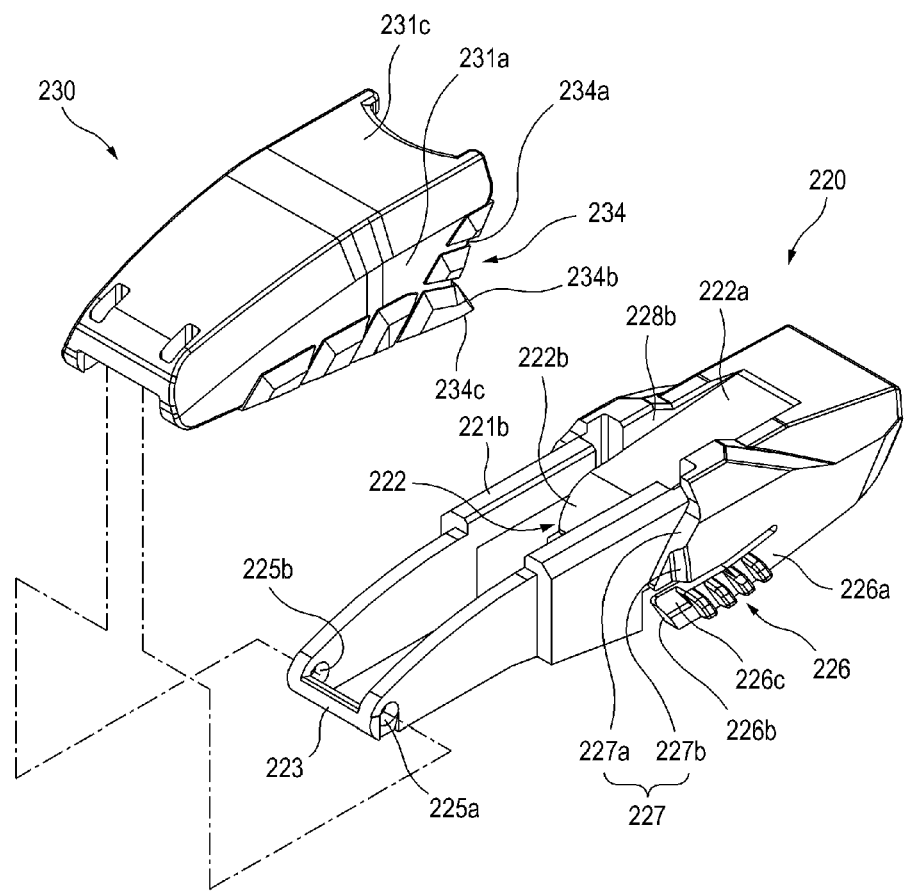
FIG. 16 is an upper perspective view of an adaptor and a cover.
Figure 17:
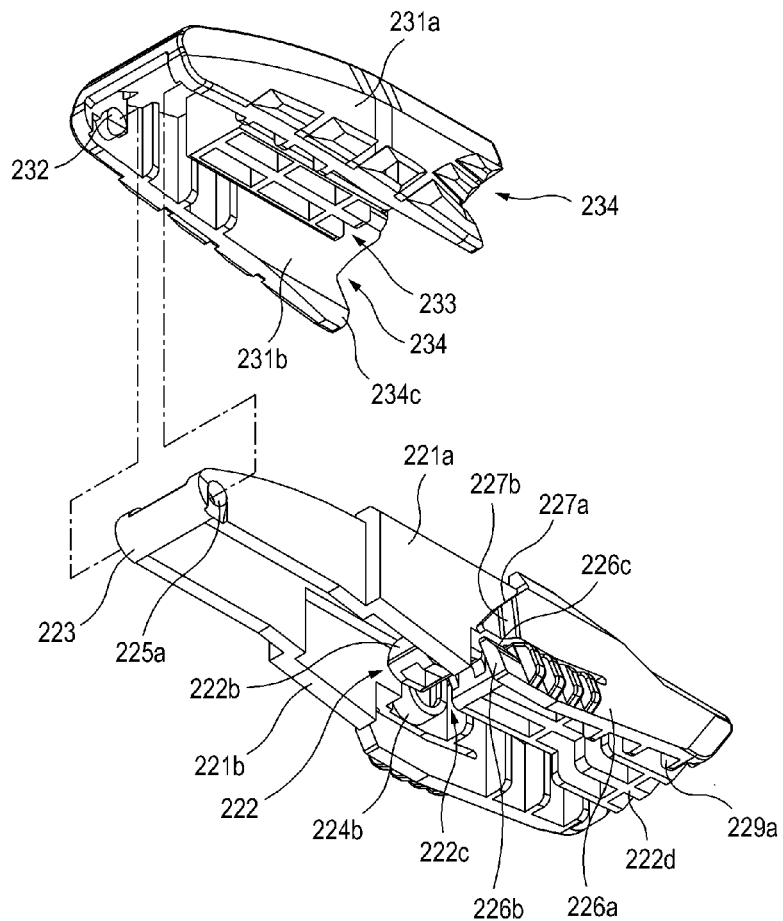
FIG. 17 is a lower perspective view of the adaptor and the cover.
Figure 18:
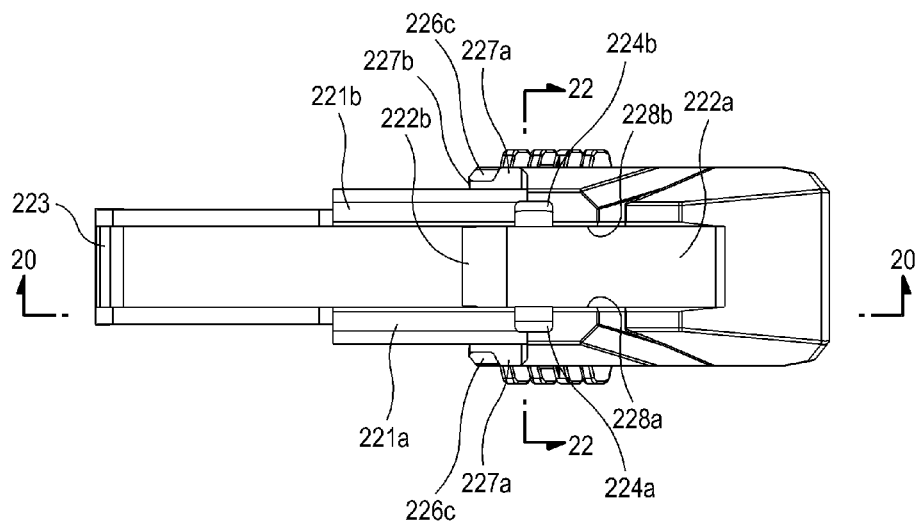
FIG. 18 is a plan view of the adaptor.
Figure 23:
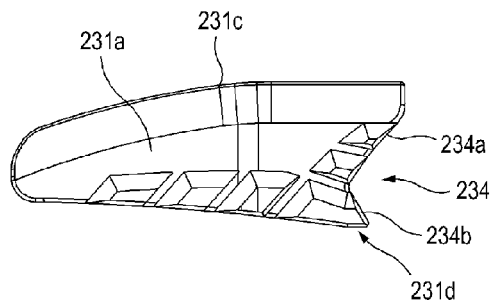
FIG. 23 is a right side view of the cover.
Figure 24:
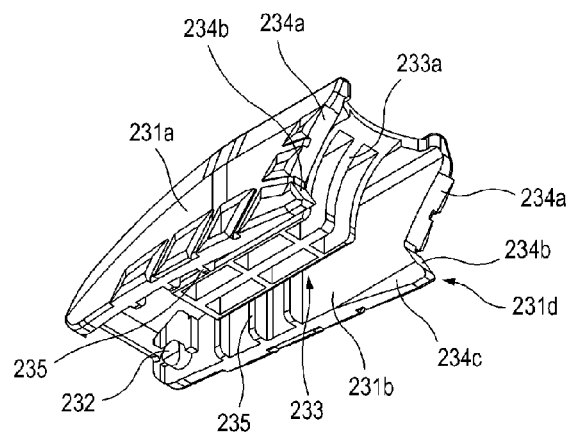
FIG. 24 is a lower perspective view of the cover.
Figure 25:
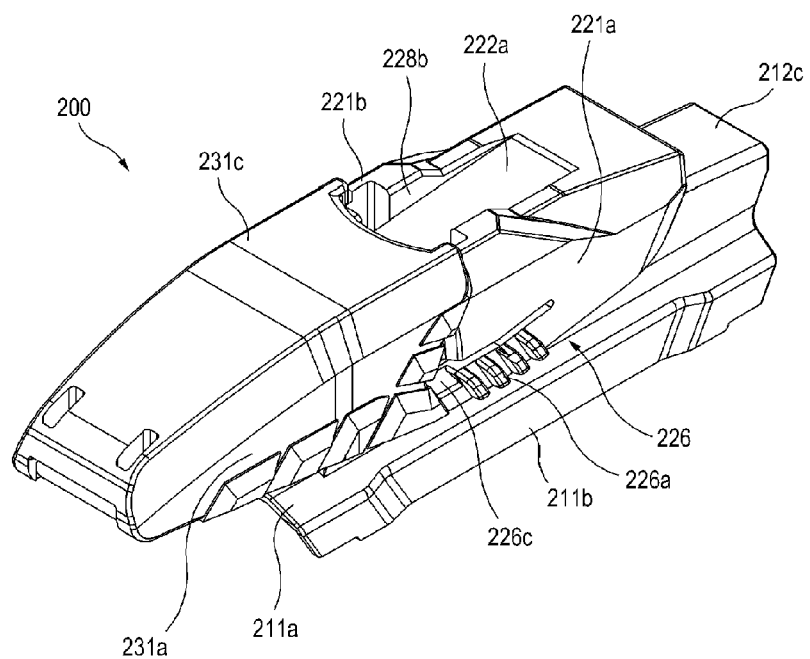
FIG. 25 is a perspective view showing an assembly comprised of the bracket, the adaptor and the cover.

As shown in FIG. 15, when the first and second spoilers 130, 140 and the bracket 210 are coupled to one another, the slot 214 is in engagement with the latching claw 136 of the first spoiler 130 and the engaging ribs 215 are in engagement with the latching grooves 146 of the second spoiler 140. As shown in FIG. 14, the frame bar 120 is fitted to the fitting grooves 132 of the first spoiler 130. Then, the base end of the first spoiler 130 abuts the front end of the bracket 210. If the first spoiler 130 is further pushed to the bracket 210, then the latching claw 136 is fitted to or engages the slot 214 to lock the first spoiler 130 and the bracket 210 to each other. Further, the frame bar 120 is fitted to the fitting grooves 142 of the second spoiler 140. Then, the base end of the second spoiler 140 abuts the rear end of the bracket 210. If the second spoiler 140 is further pushed to the bracket 210, then the engaging ribs 215 are fitted to or engage the latching grooves 146 to lock the second spoiler 140 and the bracket 210 to each other.

Descriptions will be made as to the adaptor 220 and the cover 230 with reference to FIGS. 16 to 25.

The adaptor 220 is pivotally mounted on the bracket 210 via the pivot shaft 213. The adaptor 220 is configured to support at least a portion or the entirety of the linear section 11 and to receive the curved section 12 therein. The adaptor 220 includes a pair of sidewall portions 221a, 221b and first and second bridge portion 222, 223 connecting the sidewall portions 221a, 221b to each other. A portion of the bracket 210 including the pivot shaft 213 is situated between the sidewall portions 221a, 221b.

A U-shaped shaft holder 224a, 224b protrudes inwardly on each of the sidewall portions 221a, 221b. The lateral ends 213a of the pivot shaft 213 are fitted to or engage the shaft holders 224a, 224b respectively. A distance between the inner surfaces of the sidewall portions 221a, 221b is slightly greater than a distance between outer surfaces of the support wall portions 212a, 212b of the bracket 210. Further, the distance between the inner surfaces of the sidewall portions 221a, 221b is set to receive a lateral distance (width) of the curved section 12 of the hook coupling element 10. The sidewall portions 221a, 221b have an outer surface expanding in three steps.

The first bridge portion 222 extends between the sidewall portions 221a, 221b from the rear ends of the sidewall portions 221a, 221b to an approximate midway portion. An upper surface of the first bridge portion 222 is flat and extends in a longitudinal direction of the linear section 11 of the hook coupling element 10. The upper surface of the first bridge portion 222 functions as a flat seat surface 222a on which at least a portion of the linear section 11 of the hook coupling element 10 is seated. The flat seat surface 222a is inclined downwardly at an angle relative to upper edges of the sidewall portions 221a, 221b. Thus, stepped portions 228a, 228b are defined between the flat seat surface 222a and the upper edges of the sidewall portions 221a, 221b. The stepped portions 228a, 228b extend from flat seat surface 222a in a lateral direction of the linear section 11. The stepped portions 228a, 228b allow the linear section 11 of the hook coupling element 10 to be precisely positioned on the flat seat surface 222a. Further, the stepped portions 228a, 228b contact the linear section 11 in the lateral direction, thus receiving forces in an oscillation direction during oscillating of the wiper arm 1. A front surface of the first bridge portion 222 extending from the flat seat surface 222a is rounded such that inner surface 12b of the curved section 12 is seated on the front surface, thereby forming a curved seat surface 222b for fixing of the curved section 12. The first bridge portion 222 has a recess 222c at its underside. The recess 222c participates in coupling with the pivot shaft 213 while cooperating with the shaft holders 224a, 224b. The recess 222c is recessed such that an upper portion of the pivot shaft 213 is received therein when the lateral ends 213a of the pivot shaft 213 are coupled to the shaft holders 224a, 224b. The first bridge portion 222 has an insertion section 222d at its rear side. The insertion section 222d faces to the sidewall portion 221a, 221b with a gap therebetween. Further, the adaptor 220 has ribs or protrusions 229a facing to the insertion section 222d. The protrusions 229a protrude from the rearward inner surface of the sidewall portion 221a, 221b. The protrusions 229a and the insertion section 222d are spaced apart from each other to thus receive the support wall portion 212a, 212b therebetween. When the adaptor 220 is mounted on the bracket 210, the insertion section 222d is positioned behind the pivot shaft 213 between the support wall portions 212a, 21b and the protrusions 229a face to the support wall portion 212a, 212b with a little gap. Thus, the adaptor 220 can be prevented from shaking transversely relative to an axis of the pivot shaft 213.

When the adaptor 220 is mounted on the bracket 210, the pivot shaft 213 is brought in contact with lower ends of the shaft holders 224a, 224b at its beveled surfaces 213b of the lateral ends. As the adaptor 220 is pressed down against the bracket 210, the sidewall portions 221a, 221b are elastically curved or warped outwardly. If the lateral ends 213a of the pivot shaft 213 are fully placed on concave surfaces of the shaft holders 224a, 224b, then the sidewall portions 221a, 221b elastically return, and thus, the lateral ends 213a of the pivot shaft 213 are received in the shaft holders 224a, 224b. Alternatively, the adaptor 220 may be mounted on the bracket 210 in such a manner that one lateral end of the pivot shaft 213 is fitted to one of the shaft holders 224a, 224b along the recess 222c and then the other lateral end of the pivot shaft 213 is snap-engaged to the other of the shaft holders 224a, 224b.

When the adaptor 220 is completely mounted on the bracket 210, the lateral ends 213a of the pivot shaft 213 are placed on the concave surfaces of the shaft holders 224a, 224b and the upper portion of the pivot shaft 213 is positioned in the recess 222c with a little play or clearance. As such, the adaptor 220 and the bracket 210 are assembled together as the lateral ends 213a of the pivot shaft 213 are supported by the shaft holders 224a, 224b. Thus, the adaptor 220 can rotate clockwise or counter-clockwise around the pivot shaft 213 with respect to the bracket 210 within a certain angular range. Accordingly, when the flat wiper blade 100 is moved on the windshield surface by the wiper arm 1, the flat wiper blade 100 can be placed in close contact with the windshield surface in conformance with a curvature of the windshield surface.

The second bridge portion 223 is located at front ends of the sidewall portions 221a, 221b. Apertures 225a, 225b for pivotally attaching the cover 230 are formed in the respective sidewall portions 221a, 221b adjacent to the second bridge portion 223.

The cover 230 is attached to the adaptor 220 so as to be pivotable in a longitudinal direction of the adaptor 220 (i.e., in the longitudinal direction of the linear section 1). The cover 230 participates in the fixing activity between the adaptor 220 and the curved section 12 and functions to cover or hide the curved section 12 of the wiper arm 1 and a portion of the adaptor 220. The cover 230 has a generally inverted U-shaped cross section. The cover 230 has a top plate 231c and a pair of side plates 231a, 231b. When the cover 230 is fixed to the adaptor 220, the top plate 231c is placed on top of the sidewall portions 221a, 221b and the side plates 231a, 231b face to the sidewall portions 221a, 221b, respectively. Fitting pins 232 for pivotal attachment of the cover 230 to the adaptor 220 protrude inwardly of the cover 230 in one end portion of the cover 230, that is, a front end of the side plates 231a, 231b. The fitting pins 232 are fitted to the apertures 225a, 225b formed in the vicinity of the second bridge portion 224 of the adaptor 220, respectively. The fitting pin 232 has a beveled surface at its lower portion to facilitate the fitting engagement. The cover 230 may be easily attached to the adaptor 220 by contacting the fitting pins 232 to the front end of the sidewall portions 221a, 221b and pressing it toward the adaptor 220.

The connecting unit 200 is configured to separably connect the adaptor 220 to the hook coupling element 10. The connecting unit 200 includes the following: a first fixing device for fixing between the adaptor 220 and the hook coupling element 10 in the lateral direction of the hook coupling element 10; a second fixing device for fixing between the adaptor 220 and the hook coupling element 10 in the longitudinal direction of the hook coupling element 10; and a cover fixing device configured to separably fix the cover 230 to the adaptor 220 to lock the second fixing device. Said first fixing device comprises a first fixing element provided in the adaptor 220. Said second fixing device comprises a second fixing element provided in the adaptor 220 and a third fixing element provided in the cover 230. The second and third fixing elements are formed complementarily or correspondingly to each other. Said cover fixing device comprises a first locking element provided in the adaptor 220 and a second locking element provided in the cover 230. The second locking element corresponds to the first locking element and is coupled the first locking element.

Specifically, the adaptor 220 and at least a portion of the linear section 11 of the hook coupling element are fixed via said first fixing element in the lateral direction of the linear section 11. Said first fixing element may comprise: a flat seat surface on which at least the portion of the linear section 11 is seated; and a pair of stepped portions extending from the flat seat surface. The flat seat surface extends in the adaptor 220 in the longitudinal direction of the linear section 11. The stepped portions extend in the adaptor 220 in the lateral direction of the linear section 11.

In this embodiment, said first fixing element includes the following: the flat seat surface 222a forming the upper surface of the first bridge portion 222; and the stepped portions 228a, 228b formed between the sidewall portions 221a, 221b and the flat seat surface 222a of the first bridge portion 222. As described above, when the adaptor 220 is connected to the hook coupling element 10, at least the portion of the linear section 11 (a portion of the linear section 11 located rearward from the curved section 12) is seated on the flat seat surface 222a of the first bridge portion 222 as sandwiched or pinched by the stepped portions 228a, 228b, thereby preventing displacement in the lateral direction (displacement in the lateral direction of the linear section 11) between the adaptor 220 and the hook coupling element 10.

In some embodiment, the stepped portions have a constant depth from the upper edge of the sidewall portions 221a, 221b. In some embodiment, the stepped portions are arranged sporadically along either edge of the flat seat surface 222a.

The adaptor 220 and the curved section 12 of the hook coupling element 10 are fixed via said second and third fixing elements in the longitudinal direction of the linear section 11. Said second fixing element may comprise a curved seat surface on which at least a portion of the curved section 12 is seated. Said third fixing element may comprise a curved fixing surface fixing the curved section 12 in cooperation with the curved seat surface. The curved fixing surface is positioned to face to the outer surface 12a of the curved section 12 with a little gap therebetween or contact the outer surface 12a when the cover 230 is fixed to the adaptor 220. The curved seat surface and the curved fixing surface are curved with a curvature equal to or corresponding to the curvature of the curved section 12.

In this embodiment, said second fixing element comprises the curved seat surface 222b defining the front surface of the first bridge portion 222 between the sidewall portions 221a, 221b. Further, said third fixing element comprises a curved fixing surface 223a formed in the cover 230. The curved fixing surface 233a is located as protruding rearward from the inner surface of the top plate 231c of the cover 230. The curved fixing surface 233a is positioned to contact the outer surface 12a or to face to the outer surface 12a with a little gap therebetween when the cover 230 is fixed to the adaptor 220. The curved fixing surface 233a is formed in a rear end of a pawl 233 protruding from the inner surface of the top plate 231c. When the cover 230 is fixed to the adaptor 220, the pawl 233 is interposed between the sidewall portions 221a, 221b and thus the curved fixing surface 233a faces to the outer surface 12a of the curved section 12 with a little gap or contacts the outer surface 12a. Accordingly, the curved fixing surface 233a fixes at least the portion of the curved section 12 seated on the curved seat surface 222b relative to the curved seat surface 222b in the longitudinal direction of the linear section 11, thereby preventing displacement in the longitudinal direction between the adaptor 220 and the curved section 12.

Said cover fixing device separably fixes the cover 230 to the adaptor 220 to thereby lock the second fixing element (the curved seat surface 222b) and the third fixing element (the fixing curved surface 233a) to each other. Said cover fixing device fixes the cover 230 to the adaptor 220 such that the second fixing element and the third fixing element are not displaced or moved away from each other.

Said first locking element and said second locking element of the cover fixing device are configured to complementarily engage each other. Further, the first and second locking elements are configured to snap-engage or elastically engage each other. The second locking element may comprise a rear edge of the cover 230. The first locking element may comprise a part that is formed in the adaptor 220 and elastically engages said rear edge. The engaging part of the adaptor may include a latch that engages the second locking element at its front end or tip end and can be elastically curved or flexed inwardly or outwardly of the adaptor 220. Said cover fixing device fixes the cover 230 to the adaptor 220 by engagement between the first locking element and the second locking element when the cover 230 is pivoted to the adaptor 220.

In this embodiment, said second locking element includes a locking notch 234 formed in the rear edge of each side plate 231a, 231b of the cover 230. The locking notch 234 has a V-shape concave toward the adaptor 220. The locking notch 234 has a second engagement surface 234b and a pressure surface 234c. The second engagement surface 234b is located at a lower section of the locking notch 234. The pressure surface 234c adjoins the second engagement surface 234b and is located in the lower end of the side plate 231a, 231b. The pressure surface 234c is inclined outwardly of the side plate 231a, 231b. The locking notch 234 has a second stopper surface 234a for restricting the fixing position of the cover 230. The second stopper surface 234a is located in at an upper section of the locking notch 234 and is longer than the second engagement surface 234a.

In this embodiment, said first locking element includes a latch 226 extending from each of the sidewall portions 221a, 221b and having flexibility. When the cover 230 is pivoted to the adaptor 220, the latch 226 snap-engages or elastically engages the edge of the cover 230, i.e. the locking notch 234 at its front end.

Further, each sidewall portion 221a, 221b includes a stepped portion 227, which the edge of the cover 230 abuts. The second stopper surface 234a of the locking notch 234 abuts against or seated on the stepped portion 227. The stepped portion 227 restricts the fixing position of the cover 230. The stepped portion 227 is formed in the outer surface of the each sidewall portion 221a, 221b. A front end surface of the stepped portion 227 complementarily corresponds to the shape of the upper section of the locking notch 234. The stepped portion 227 has a first stopper surface 227a and a concave surface 227b. The first stopper surface 227a is inclined at the same inclination as the second stopper surface 234a such that the second stopper surface 234a of the locking notch 234 is seated on the first stopper surface 227a. The concave surface 227b of the stepped portion 227 permits passage of a lower end portion 231d of the cover 230, in which the second engagement surface 234b of the locking notch 234 is located in the side plates 231a, 231b of the cover 230. The concave surface 227b is concave from the front end of the first stopper surface 227a.

The latch 226 has a latch arm 226a that can be elastically curved or flexed inwardly of the sidewall portion 221a, 221b. The lower portion of the sidewall portion 221a, 221b is generally horizontally slit in part from the stepped portion 227 to thereby form the latch arm 226a. Thus, a lower end of the latch 226 defines a portion of a lower end of the sidewall portion 221a, 221b. The latch arm 226a extends frontward from the rear end portion of each sidewall portion 221a, 221b. A front end of the latch 226 has a thickness as thick as the first stopper surface 227a of the stepped portion 227. Further, the latch 226 has a first engagement surface 226b and a contact surface 226c at its front end. The first engagement surface 226b engages the second engagement surface 234b of the locking notch. The contact surface 226c contacts the pressure surface 234c of the locking notch. The first engagement surface 226b is inclined at the same angle as the second engagement surface 234b of the locking notch. The contact surface 226c adjoins the first engagement surface 226b and is formed in an outer surface of the latch arm 226a. The contact surface 226c is located toward the concave surface 227b of the stepped portion 227 and is inclined inwardly of the sidewall portion 221a, 221b.

When the cover 230 is pivoted to the adaptor 220, the lower end portion 231d with the second engagement surface 234b of the locking notch formed therein passes by the concave surface 227b of the stepped portion 227 and the pressure surface 234c of the locking notch is brought into abutment with the contact surface 226c. As the cover 230 is further pivoted toward the adaptor 220, the lower end portion 231d presses down the contact surface 226c and the latch 226 is curved or flexed inwardly of the sidewall portion 221a, 221b under the reaction to the forces applied to the pressure surface 234c and the contact surface 226c. If the lower end portion 231d passes beyond the contact surface 226c and the front end of the latch 226, then the latch 226 returns and then the first engagement surface 226b of the latch 226 (i.e., the front end surface of the latch 226) is brought into engagement with the second engagement surface 234b of the locking notch 234. At this time, the second stopper surface 234a of the locking notch 234 is placed into contact with the first stopper surface 227a of the stepped portion 227.

In other embodiments, said latch may protrude from the outer surface of the sidewall portion 221a, 221b and extend forwardly. Further, said pressure surface of the locking notch may be inclined inwardly in an outer surface of the side plate of the cover 230 and said contact surface of the latch may be inclined outwardly of the sidewall portion 221a, 221b accordingly. In such a case, said latch may be curved outwardly of the sidewall portion 221a, 221b when engaging the cover 230. Further, in some embodiment, said locking notch may not include said second stopper surface and the sidewall portions 221a, 221b may not include said first stopper surface.

Further, in this embodiment, the cover 230 has a plurality of ribs or protrusions 235 protruding from an inner surface of each side plate 231a, 231b. When the cover 230 is fixed to the adaptor 220, the protrusions 235 face to the outer surface of each sidewall portion 221a, 221b with a little gap therebetween. Thus, when the cover 230 is fixed to the adaptor 220, the cover 230 is prevented from transversely shaking.

Figure 26:
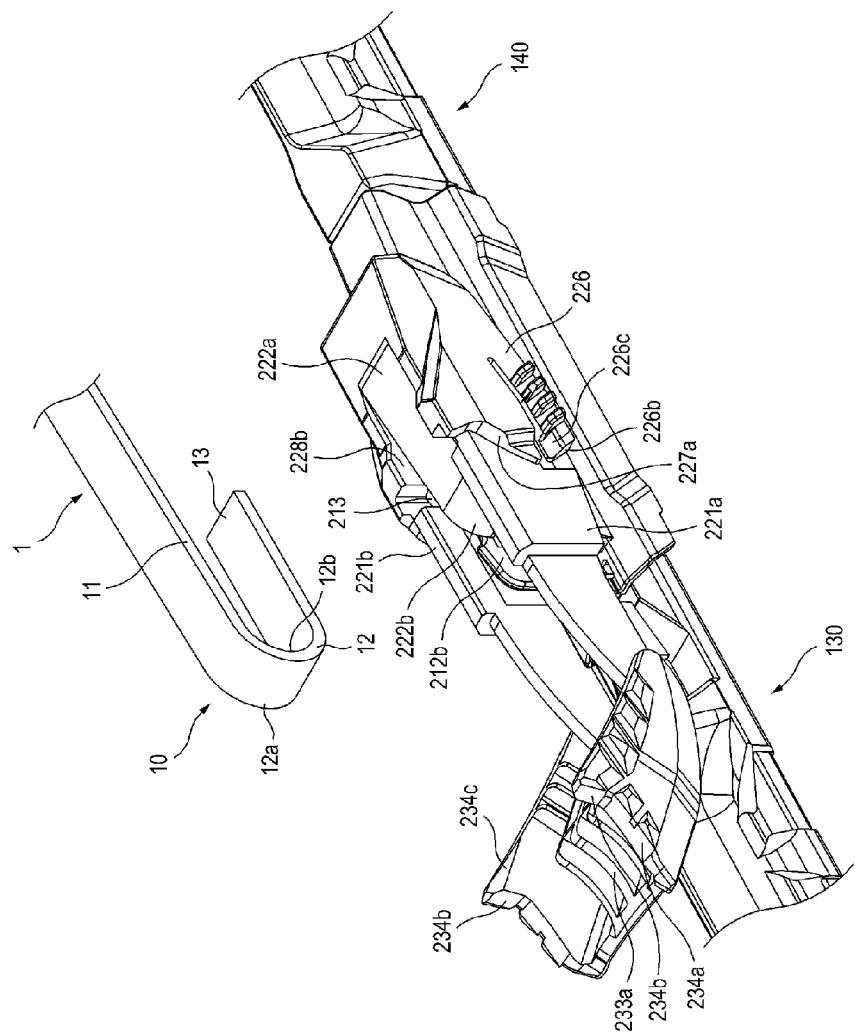
FIG. 26 shows an exemplary connection between a flat wiper blade and a wiper arm using the connecting unit.
Figure 27:
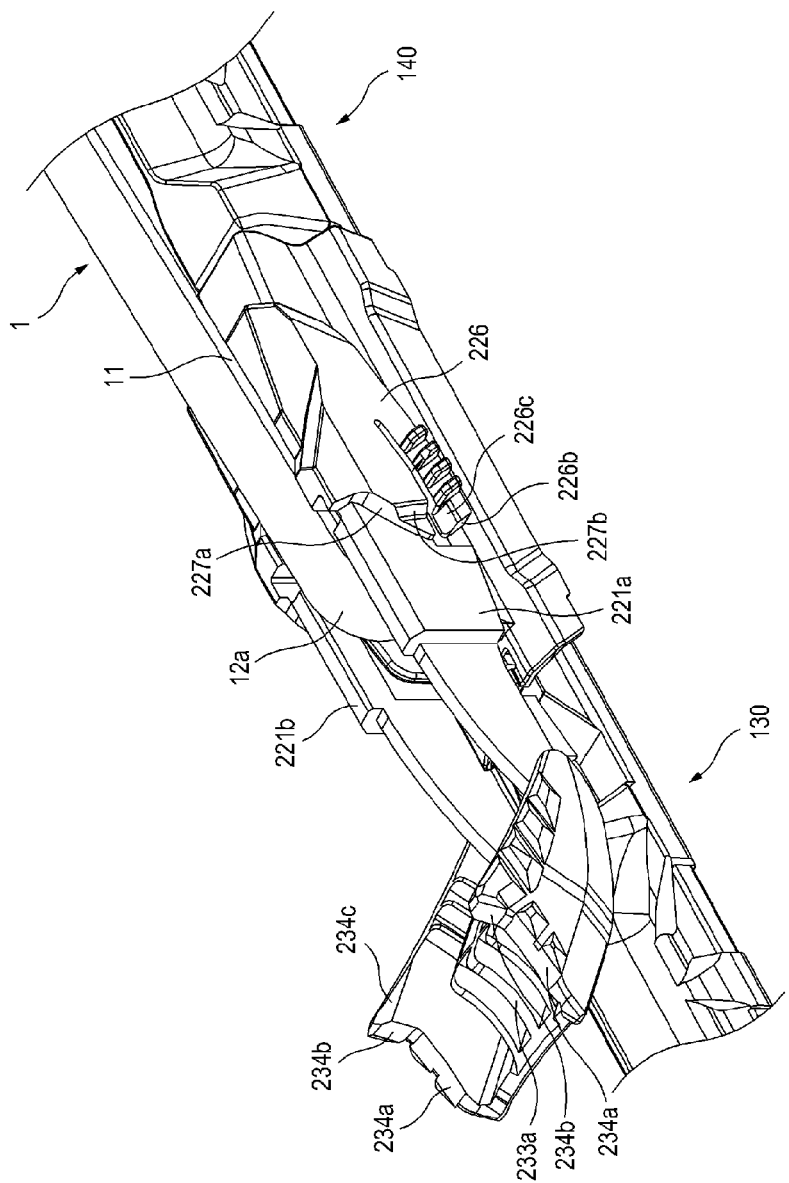
FIG. 27 shows an exemplary connection between a flat wiper blade and a wiper arm using the connecting unit.
Figure 28:
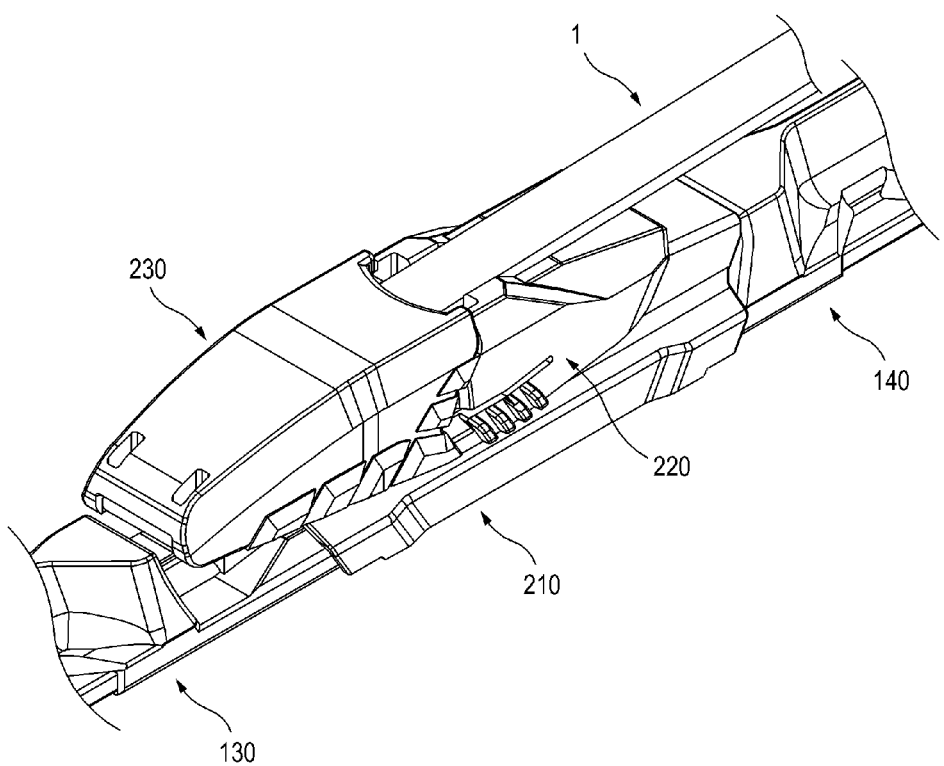
FIG. 28 shows an exemplary connection between a flat wiper blade and a wiper arm using the connecting unit.

FIGS. 26 to 28 show a connection example between the wiper arm 1 and the flat wiper blade 100 according to the embodiments.

As shown in FIG. 26, the extension section 13 of the hook coupling element 10 is inserted from the front of the sidewall portions 221a, 221b through between the sidewall portions 221a, 221b of the adaptor 220 to the underside of the first bridge portion 222, as the cover 230 is turned upward from the adaptor 220.

If the insertion is finished as shown in FIG. 27, the linear section 11 of the hook coupling element 10 is seated on the flat seat surface 222a of the first bridge portion 222 between the stepped portions 228a, 228b and the inner surface 12b of the curved section 12 is seated on the curved seat surface 222b of the first bridge portion 222 with the extension section 13 located beneath the pivot shaft 213 and the first bridge portion 222. Further, when the insertion is finished, the linear section 11 is seated on the flat seat surface 222a as laterally supported by one or both of the stepped portions 228a, 228b.

Thereafter, the cover 230 is pivoted toward and then fixed to the adaptor 220. If the cover 230 is fully fixed as shown in FIG. 28, then the second stopper surface 234a of the locking notch 234 in the cover 230 is in contact with the first stopper surface 227a of the stepped portion 227 and the second engagement surface 234b of the locking notch 234 is in engagement with the first engagement surface 226b of the latch 226. Further, at this time, the curved fixing surface 233a of the cover 230 contacts the outer surface 12a of the curved section 12 or faces to the outer surface 12a with a little gap. The curved section 12 is fixed relative to the curved seat surface 222b by the curved fixing surface 233a. In this manner, the flat wiper blade 100 is connected to the wiper arm 1 via the connecting unit 200.

When separating the flat wiper blade 100 from the wiper arm 1, the latch 226 is pressed inwardly of the sidewall portion 221a, 221b and then the cover 230 is pivoted upward from the adaptor 220. By pressing the latch 226 inwardly of the sidewall portion 221a, 221b, the second engagement surface 234b of the cover 230 and the first engagement surface 226b of the adaptor 220 are disengaged from each other. The adaptor 220 with the cover 230 turned upward is pulled out of the hook coupling element 10 in the longitudinal direction of the wiper arm 1, thus separating the flat wiper blade 100 from the wiper arm 1.

While the present invention has been shown and described by way of the foregoing embodiments, the present invention should not be limited thereto. It will be apparent to those of ordinary skill in the art that various alternations or modifications may be made without departing from the scope of the present invention.

The invention claimed is:

1. A connecting unit (200) for separably connecting a flat wiper blade (100) to a hook wiper arm (1) with a linear section (11) and a curved section (12) extending from the linear section at a distal end, the connecting unit comprising:
a bracket (210) fixed to a frame (120) of a flat wiper blade, the bracket having a pivot shaft (213);
an adaptor (220) pivotally mounted on the bracket via the pivot shaft, the adaptor being configured to support at least a portion of the linear section and to receive the curved section; and a cover (230) pivotally attached to the adaptor in a longitudinal direction of the linear section, wherein the adaptor includes:

a first fixing element (222a, 228a, 228b) for fixing between the adaptor and at least the portion of the linear section in a lateral direction of the linear section;

a second fixing element (222b) for fixing between the adaptor and the curved section in the longitudinal direction of the linear section; and a first locking element (226, 227) for separable fixing between the cover and the adaptor; and a pair of sidewall portions (221a, 221b), the pivot shaft being fitted to inner surfaces of the sidewall portions, wherein the cover includes a third fixing element (233a) corresponding to the second fixing element and a second locking element corresponding to the first locking element, wherein when the first locking element and the second locking element are in engagement with each other, the third fixing element fixes at least a portion of the curved section relative to the second fixing element in the longitudinal direction of the linear section, wherein the second fixing element comprises a curved seat surface (222b), at least the portion of the curved section being seated on the curved seat surface, and the third fixing element comprises a curved fixing surface (233a) facing at least the portion of the curved section, wherein when the cover is fixed to the adaptor, the curved seat surface and the curved fixing surface are locked relative to each other, wherein the first locking element comprises a flexible latch (226) extending from one of, the sidewall portions, and having a first engagement surface (226b) at a front end, wherein the second locking element comprises a locking notch (234) of the cover engaging the first engagement surface, wherein a lower portion of said one of the sidewall portions, is slit in part to form the latch and a lower end of the latch defines a portion of a lower end of said one of the sidewall portions, and wherein the latch elastically curves by contact to the cover and snap-engages the locking notch of the cover.

2. The connecting unit of claim 1, wherein the first fixing element comprises:

a flat seat surface (222a), at least the portion of the linear section being seated on the flat seat surface; and a pair of stepped portions (228a, 228b) contacting at least the portion of the linear section, and wherein the flat seat surface extends in the longitudinal direction of the linear section and the stepped portions extend from the flat seat surface in the lateral direction of the linear section.

3. The connecting unit of claim 1, wherein the frame has a pair of notches (123) at opposed edges, wherein the bracket includes a pair of holding claws (211f) and an engaging protrusion (211e) at each of lower opposed edges, and wherein the edges of the frame lie on the holding claws and the notch and the engaging protrusion engage each other.

4. A connecting unit (200) for separably connecting a flat wiper blade (100) to a hook wiper arm (1) with a linear section (11) and a curved section (12) extending from the linear section at a distal end, the connecting unit comprising:

a bracket (210) fixed to a frame (120) of a flat wiper blade, the bracket having a pivot shaft (213);

an adaptor (220) pivotally mounted on the bracket via the pivot shaft, the adaptor being configured to support at least a portion of the linear section and to receive the curved section; and a cover (230) pivotally attached to the adaptor in a longitudinal direction of the linear section, wherein the adaptor includes:

a first fixing element (222a, 228a, 228b) for fixing between the adaptor and at least the portion of the linear section in a lateral direction of the linear section;

a second fixing element (222b) for fixing between the adaptor and the curved section in the longitudinal direction of the linear section; and a first locking element (226, 227) for separable fixing between the cover and the adaptor, wherein the cover includes a third fixing element (233a) corresponding to the second fixing element and a second locking element corresponding to the first locking element, wherein when the first locking element and the second locking element are in engagement with each other, the third fixing element fixes at least a portion of the curved section relative to the second fixing element in the longitudinal direction of the linear section, wherein the adaptor includes a pair of sidewall portions (221a, 221b) and a first bridge portion (222) connecting the sidewall portions, the pivot shaft being fitted to inner surfaces of the sidewall portions, wherein the second fixing element comprises a curved seat surface (222b) formed in a front end of the first bridge portion, at least the portion of the curved section being seated on the curved seat surface, wherein the third fixing element comprises a curved fixing surface (233a) protruding from an inside of the cover and facing to at least the portion of the curved section, wherein the first locking element comprises a flexible latch (226) having a first engagement surface (226b) and extending from one of the sidewall portions, wherein the second locking element comprises a locking notch (234) formed in an edge of the cover and having a second engagement surface (234b) engaging the first engagement surface, wherein when the first engagement surface and the second engagement surface engage each other, the curved fixing surface fixes at least the portion of the curved section relative to the curved seat surface in the longitudinal direction of the linear section, and wherein a lower portion of said one of the sidewall portions, is slit in part to form the latch and a lower end of the latch defines a portion of a lower end of said one of the sidewall portions.

5. The connecting unit of claim 4, wherein the latch includes a contact surface (226c) adjoining the first engagement surface and the locking notch includes a pressure surface (234c) adjoining the second engagement surface, and wherein when the cover is pivoted to the adaptor the pressure surface is brought into contact with the contact surface.

6. The connecting unit of claim 4, wherein the locking notch includes a second stopper surface (234a), and said one of the sidewall portions, includes a first stopper surface (227a) complementarily contacting the second stopper surface.

7. The connecting unit of claim 4, wherein the sidewall portions include a shaft holder (224a, 224b) on the respective inner surfaces, the shaft holders supporting ends of the pivot shaft respectively, and wherein the first bridge portion includes a recess (222c) configured to receive the pivot shaft.

8. The connecting unit of claim 4, wherein the first fixing element comprises:
- a flat seat surface (222a) formed in the first bridge portion and extending in the longitudinal direction of the linear section; and
- a pair of stepped portions (228a, 228b) formed between the flat seat surface and upper ends of the sidewall portions, and
- wherein at least the portion of the linear section is seated on the flat seat surface between the stepped portions.

9. A flat wiper blade comprising:
- a wiper strip (110);
- a frame (120) configured to hold and support the wiper strip;
- first and second spoilers (130, 140) configured to be joined to the frame by fitting engagement; and
- a connecting unit (200) for separable connection to a hook wiper arm (1) with a linear section (11) and a curved section (12) extending from the linear section at a distal end, the connecting unit being coupled to the frame between the first and second spoilers,
- wherein the connecting unit comprises:
- a bracket (210) fixed to the frame (120), the bracket having a pivot shaft (213);
- an adaptor (220) pivotally mounted on the bracket via the pivot shaft, the adaptor being configured to support at least a portion of the linear section and to receive the curved section; and
- a cover (230) pivotally attached to the adaptor in a longitudinal direction of the linear section
- wherein the adaptor includes:
- a first fixing element (222a, 228a, 228b) for fixing between the adaptor and at least the portion of the linear section in a lateral direction of the linear section;
- a second fixing element (222b) for fixing between the adaptor and the curved section in the longitudinal direction of the linear section;
- a first locking element (226, 227) for separable fixing between the cover and the adaptor; and
- a pair of sidewall portions (221a, 221b), the pivot shaft being fitted to inner surfaces of the sidewall portions,
- wherein the cover includes a third fixing element (233a) corresponding to the second fixing element and a second locking element corresponding to the first locking element,
- wherein when the first locking element and the second locking element are in engagement with each other, the third fixing element fixes at least a portion of the curved section relative to the second fixing element in the longitudinal direction of the linear section,
- wherein the second fixing element comprises a curved seat surface (222b), at least the portion of the curved section being seated on the curved seat surface, and the third fixing element comprises a curved fixing surface (233a) facing at least the portion of the curved section,
- wherein when the cover is fixed to the adaptor, the curved seat surface and the curved fixing surface are locked relative to each other,
- wherein the first locking element comprises a flexible latch (226) extending from one of, the sidewall portions, and having a first engagement surface (226b) at a front end,
- wherein the second locking element comprises a locking notch (234) of the cover engaging the first engagement surface,
- wherein a lower portion of said one of the sidewall portions, is slit in part to form the latch and a lower end of the latch defines a portion of a lower end of said one of the sidewall portions, and
- wherein the latch elastically curves by contact to the cover and snap-engages the locking notch of the cover.

10. The flat wiper blade of claim 9, wherein the first spoiler (130) and the bracket (210) of the connecting unit engage each other and the second spoiler (140) and the bracket engage each other.

11. A flat wiper blade comprising:
- a wiper strip (110);
- a frame (120) configured to hold and support the wiper strip;
- first and second spoilers (130, 140) configured to be joined to the frame by fitting engagement; and
- a connecting unit (200) for separable connection to a hook wiper arm (1) with a linear section (11) and a curved section (12) extending from the linear section at a distal end, the connecting unit being coupled to the frame between the first and second spoilers,
- wherein the connecting unit comprises:
- a bracket (210) fixed to the frame (120), the bracket having a pivot shaft (213);
- an adaptor (220) pivotally mounted on the bracket via the pivot shaft, the adaptor being configured to support at least a portion of the linear section and to receive the curved section; and
- a cover (230) pivotally attached to the adaptor in a longitudinal direction of the linear section
- wherein the adaptor includes:
- a first fixing element (222a, 228a, 228b) for fixing between the adaptor and at least the portion of the linear section in a lateral direction of the linear section;
- a second fixing element (222b) for fixing between the adaptor and the curved section in the longitudinal direction of the linear section; and
- a first locking element (226, 227) for separable fixing between the cover and the adaptor,
- wherein the cover includes a third fixing element (233a) corresponding to the second fixing element and a second locking element corresponding to the first locking element,
- wherein when the first locking element and the second locking element are in engagement with each other, the third fixing element fixes at least a portion of the curved section relative to the second fixing element in the longitudinal direction of the linear section,
- wherein the adaptor includes a pair of sidewall portions (221a, 221b) and a first bridge portion (222) connecting the sidewall portions, the pivot shaft being fitted to inner surfaces of the sidewall portions,
- wherein the second fixing element comprises a curved seat surface (222b) formed in a front end of the first bridge portion, at least the portion of the curved section being seated on the curved seat surface,
- wherein the third fixing element comprises a curved fixing surface (233a) protruding from an inside of the cover and facing to at least the portion of the curved section,
- wherein the first locking element comprises a flexible latch (226) having a first engagement surface (226b) and extending from one of the sidewall portions,
- wherein the second locking element comprises a locking notch (234) formed in an edge of the cover and having a second engagement surface (234b) engaging the first engagement surface, wherein when the first engagement surface and the second engagement surface engage each other, the curved fixing surface fixes at least the portion of the curved section relative to the curved seat surface in the longitudinal direction of the linear section, and wherein a lower portion of said one of the sidewall portions, is slit in part to form the latch and a lower end of the latch defines a portion of a lower end of said one of the sidewall portions.

12. The flat wiper blade of claim 11, wherein the first spoiler (130) and the bracket (210) of the connecting unit engage each other and the second spoiler (140) and the bracket engage each other.

* * * * *